United States Patent Office 3,221,067
Patented Nov. 30, 1965

3,221,067
METHYLENE SUBSTITUTED BICYCLIC COMPOUNDS
Victor Mark, Olivette, Mo., assignor to Monsanto Company, a corporation of Delaware
No Drawing. Filed Aug. 24, 1960, Ser. No. 51,484
4 Claims. (Cl. 260—648)

This invention relates to a family of novel chemical compounds and to the method for their preparation. More specifically, the invention is directed to biologically active compounds derived from cyclopentadiene. The compounds provide a new class of herbicides and, furthermore, are useful intermediates in the preparation of compounds having insecticidal and fungicidal activity.

The new class of compounds may be represented by the structural formula

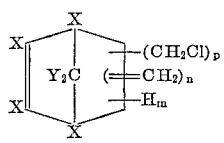

wherein $p$ is an integer from zero (0) to one (1), wherein $n$ is an integer from one (1) to two (2), wherein $m$ is an integer from zero (0) to two (2), and the sum, $2n+m+p$ is always 4; wherein the several X's are the same or different atoms of the group consisting of chlorine, iodine, bromine, and fluorine, and the Y's are selected from the group consisting of X and hydrogen.

The new compounds are prepared from compounds of the structure

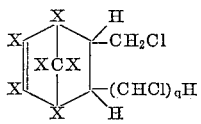

in which $q$ is an integer from zero (0) to one (1).

These are known and can be readily synthesized by the Diels-Alder addition of the halocyclopentadienes with either allyl chloride or 1,4-dichloro-2-butylene, depending upon the number of the substituents ($CH_2Cl$) desired. When Y is different from X it can be substituted for a halogen by known procedures.

The dehydrochlorination of the 1,2,3,4,7,7-hexachloro-5-chloromethyl-2-norbornene produces the 1,2,3,4,7,7-hexachloro-5-methylene-2-norbornene or substituted analogues:

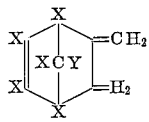

If 1,2,3,4,7,7 - hexachloro - 5,6 - bis(chloromethyl) - 2-norbornene or substituted analogues are dehydrochlorinated, one of two classes of compounds or a mixture of classes can be prepared:

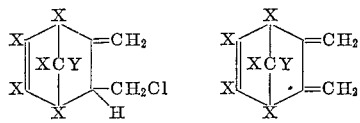

The dehydrochlorination may be conducted by contacting the chloromethyl and bis(chloromethyl) chloronorbornenes with a base, such as alkali metal hydroxides, alkali earth metal oxides and hydroxides, ammonia and ammonium hydroxide and various amines, such as trimethylamine, triethylamine, dicyclohexylamine, pyridine, quinoline, and various quaternary ammonium hydroxides. One of the most often used method consists in refluxing an alcoholic solution or an aqueous slurry or emulsion of the chlorohydrocarbon with an alkali or alkali earth metal hydroxide until the desired degree of conversion has taken place. The dehydrochlorinated product can be separated from the alcoholic solution directly by dilution with water when it separates out as an insoluble phase, or by the stripping of the alcohol and separating the product from the inorganic salt by filtration, with or without the aid of an appropriate solvent, such as pentane, benzene, carbon tetrachloride, methylene chloride, etc. The purification of the product can be achieved by most of the usual methods, such as distillation, preferably under reduced pressure, and crystallization. A useful combination of the separation-purification steps consists in the steam distillation of the dehydrochlorinated product. Such a method is especially applicable to the hexachloro-5-methylene-2-norbornene, which separates out as a water immiscible heavy layer. A limitation in the separation and purification of the hexachloro-5,6-dimethylene-2-norbornene is posed by its tendency to polymerize at higher temperatures. Above 120° this tendency to polymerize is so great that the dimethylene compound forms a white polymer in a strongly exothermic reaction. But below that temperature the rate of polymerization is slower and it even can be distilled in vacuum, and the monomer in the distillate readily crystallizes.

The new compounds have good preemergence herbicidal activity and are useful intermediates in the preparation of industrial preservatives, bactericidal agents and other useful compositions. The use as intermediates may involve the ozonolysis to form:

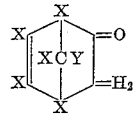

which may be subjected to chlorination to produce valuable soap bacteristats:

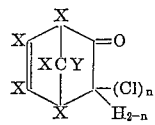

wherein $n$ is either one (1) or two (2).

Further details of the preparation and use of these materials are set forth with respect to the following specific examples.

Example I

A mixture of 1,2,3,4,7,7-hexachloro-5-(chloromethyl)-2-norbornene (60.0 g., 0.172 mole), potassium hydroxide (9.6 g., 0.172 mole) and 500 ml. of absolute ethanol was refluxed for a period of nine hours. The solvent was removed by distillation at reduced pressure and the pentane soluble portion of the residue distilled. The 1,2,3,4,7,7-hexachloro-5-methylene-2-norbornene distilled at 104° C. (2 mm.) as a colorless oil $n_D^{25}$ 1.5560 and was obtained in a yield of 95% (51.1 g.).

*Analysis.*—Calcd. for: $C_8H_4Cl_6$: C, 30.71; H, 1.29; Cl, 68.00. Found: C, 30.97; H, 1.44; Cl, 67.65. Infrared maxima: 5.97, 6.23, 6.98, 7.07, 7.99, 8.37, 8.72, 9.22, 9.53, 9.67, 10.07, 10.36, 10.92, 11.32, 11.45, 11.79, 13.53, and 13.82$\mu$.

Example II

A reaction flask was charged with a solution of 54.5 g. of 1,2,3,4,7,7 - hexachloro - 5,6 - bis(chloromethyl) - 2 - norbornene in 100 ml. of aboslute ethanol. While stirring, a solution of 15.6 g. of potassium hydroxide in 150 ml. of ethanol was added over a period of 30 minutes. The reaction mixture, which became a slurry due to the separation of potassium chloride, was refluxed for a period of 8 hours while stirring continuously. The alcohol was then evaporated in vacuum, the remaining slurry eluted with pentane and the filtered solution, after the stripping of the solvent, was distilled. The reaction product, a colorless oil, distilled between 90 and 94° C. at 0.16 mm. pressure and solidified immediately in the receiver. Recrystallization from methanol yielded white crystals which had M.P. 79–81° C. and which were identified as 1,2,3,4,7,7-hexachloro-5,6-bis(methylene)-2-norbornene.

Infrared maxima: 6.23, 7.12, 8.60, 9.00, 9.37, 9.52, 9.89, 10.53, 10.96, 11.49, 12.24, 13.27 and 14.00μ.

*Example III*

The procedure of Example II was repeated except that the product was isolated by crystallization from ethanol instead of distillation. All of the physical and spectral properties of the white crystals agreed with those of the preceding example.

*Example IV*

A sample of crystalline 1,2,3,4,7,7-hexachloro-5,6-bis(methylene)-2-norbornene was heated above its melting point. At 140° C. an exothermic reaction started and the oil solidified suddenly and entirely to an off-white polymer. The product, which did not melt up to 200° C., was soluble in halogenated solvents from which it was precipicated by alcohol or pentane.

*Example V*

Seeds of a wide variety of species were planted in a greenhouse flat and were sprayed with 1,2,3,4,7,7-hexachloro-5-methylene-2-norbornene at the rate of 25 pounds per acre. It was found that wild oats, brome grass, rye grass, barnyard grass, crab grass and sorghum were severely inhibited or killed by the treatment. However, morning glory, radish, soybeanss, wild buckwheat and tomato were not affected by the treatment.

By procedures set forth above except by using chloromethyl substituted norbornenes properly selected so as to have the desired halogen in the 1,2,3,4, and 7 positions the following can be prepared:

1,2,3,4,7,7-hexachloro-5,6-dimethylene-2-norbornene
1,2,3,4,7,7-hexachloro-6-chloromethyl-5-methylene-2-norbornene
7-bromo-1,2,3,4-tetrachloro-5-methylene-2-norbornene
1,2,3,4,7-pentachloro-7-fluoro-5-methylene-2-norbornene
7-chloro-6-chloromethyl-1,2,3,4,7-pentafluoro-5-methylene-2-norbornene
1,2,3,4,7-pentabromo-7-chloro-5-methylene-2-norbornene
1,2,3,4-tetrachloro-7,7-difluoro-5,6-dimethylene-2-norbornene
7,7-dichloro-1,2,3,4-tetraiodo-5-methylene-2-norbornene
1,2,3,4-tetrachloro-5-methylene-2-norbornene
1,2,3,4,7-pentachloro-5-methylene-2-norbornene.

In the structural formulae in the specification and claims both substituents on the bridge may be hydrogen.

The embodiments of the invention in which an exclusive property or privilege is claimed are defined as follows:

1. A compound of the structure

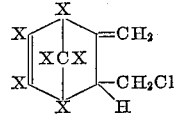

wherein each X is a halogen atom.

2. 1,2,3,4,7,7 - hexachloro - 6 - chloromethyl - 5 - methylene-2-norbornene.

3. The method of preparing compounds of the structure

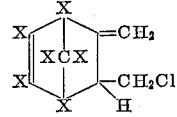

wherein each X is a halogen which comprises contacting a compound of the structure

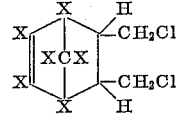

with approximately one mole equivalent of an alkali metal hydroxide.

4. The method of preparing 1,2,3,4,7,7-hexachloro-5-chloromethyl - 6 - methylene - 2 - norbornene which comprises contacting 1,2,3,4,7,7 - hexachloro - 5,6 - bis-(chloromethyl)-2-norbornene with an excess of one mole equivalent of an alkali metal hydroxide.

References Cited by the Examiner
UNITED STATES PATENTS

| | | | |
|---|---|---|---|
| 2,912,356 | 11/1959 | Schmerling | 260—648 |
| 2,951,099 | 8/1960 | Hoch | 260—648 |
| 2,960,541 | 11/1960 | Elam et al. | 260—648 |

FOREIGN PATENTS

| | | |
|---|---|---|
| 764,720 | 1/1957 | Great Britain. |

LEON ZITVER, *Primary Examiner.*

ALPHONSO D. SULLIVAN, ABRAHAM RIMENS, MILTON STERMAN, *Examiners.*